United States Patent Office 3,442,025
Patented May 6, 1969

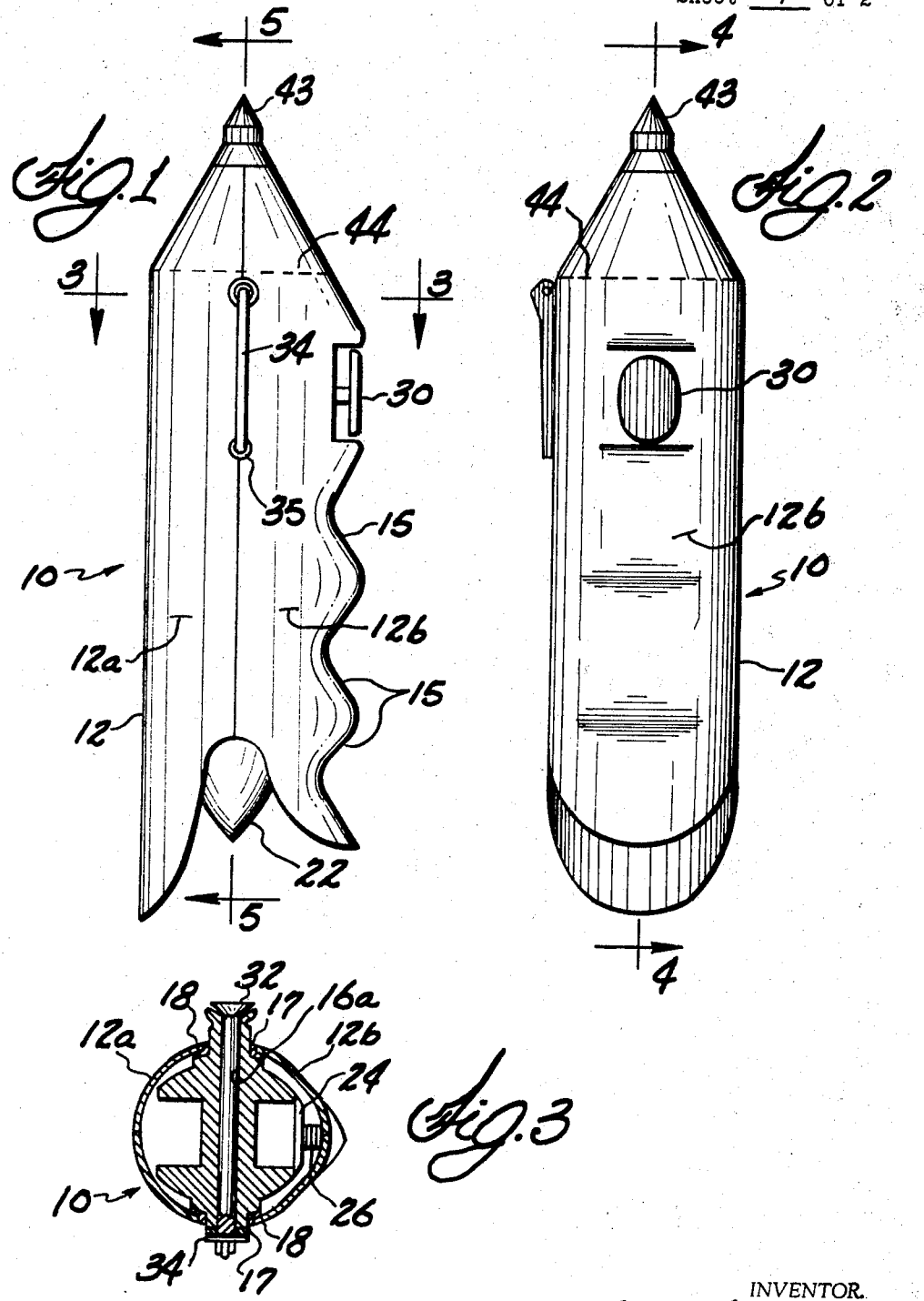

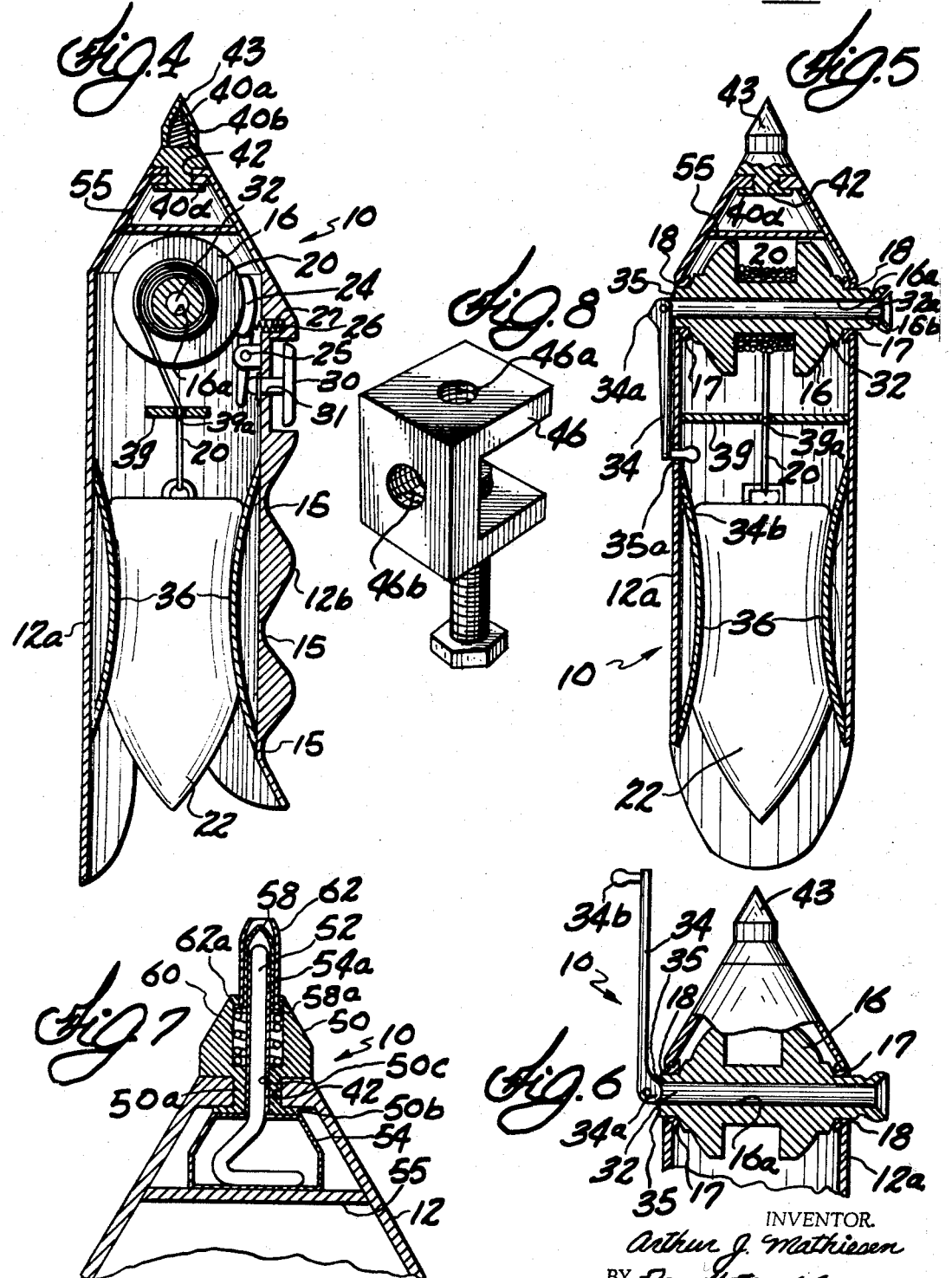

---

3,442,025
PLUMB BOB DEVICE
Arthur J. Mathiesen, 9130 Parkside,
Morton Grove, Ill. 60053
Filed Jan. 13, 1966, Ser. No. 520,429
Int. Cl. G01c *15/10*
U.S. Cl. 33—217    14 Claims

ABSTRACT OF THE DISCLOSURE

A unitary, self-storing plumb bob device including a housing, a spool within the housing having one end of a plumb line attached thereto, a plumb bob attached to the other end of the plumb line and receivable into the open end of the housing. A rewind handle, clutch, brake, and resilient retention means in the housing are provided for release and retrieval of the plumb bob during use. The plumb bob device being adapted to mark the point from which a plumb line is drawn or to secure the device to this point.

---

The present invention relates generally to a plumb bob device and, more specifically, relates to such a device having means associated with one end thereof which is adapted to mark the point from which a plumb line is drawn or to secure the device in place at the point from which the plumb line is drawn. While not so limited in its uses, the present invention finds particularly advantageous utilization in the plumbing up of columns, walls, forms and the like by, for example, carpenters or electricians.

A primary object of the present invention is to provide a new and improved plumb bob device. More specifically, it is an object to provide a new and improved plumb bob device having means associated with one end thereof which is adapted to mark the point from which a plumb line is drawn. A further object is to provide such a device having means associated with one end thereof which is adapted to mark the point from which a plumb line is drawn or to secure the device at the point from which the plumb line is drawn. In this latter connection, it is an object to provide such a device which is adapted for use with a beam clamp or the like.

Still another object of the present invention is to provide a device as set forth above which may be conveniently used with one hand, while leaving the other hand free for other purposes, such as for holding on when working on high structures.

An additional object of the present invention is to provide a new and improved plumb bob device having new and improved clutch means associated with the rewind handle of the device.

A still further object of the presen invention is to provide such a device including resilient means for engaging the plumb bob when the plumb bob is in the stored position to aid in retaining the plumb bob in the stored position.

More specifically, it is an object to provide a device as set forth above which includes a wick-like marking element and includes means for normally enclosing the marking element that is operable to expose the marking element so that a desired mark may be made thereby.

Another more specific object is to provide a device as set forth above which includes a screw-like marking member that is adapted to mark the point from which a plumb line is drawn or to secure the device at the point from which the plumb line is drawn.

A further object of the present invention is to provide a unitary, self-storing plumb bob device.

A general object of the present invention is to provide a new and improved plumb bob device characterized in its simplicity, economy, ease of handling and ease of operation.

Other objects and advantages of the invention will become apparent upon reading the attached, detailed description taken in conjunction with the drawings.

In one form of the present invention, a plumb bob device is provided which includes an elongated housing having one open end. A spool is mounted within the housing for rotational movement and a plumb line is provided which has one end secured to the spool for winding thereon, the plumb line being slidable through the open end of the housing. A plumb bob is secured to the other end of the plumb line and is receivable within the open end of the housing. Additionally, means are provided for centering the plumb line in the open end of the housing and means are provided which are operable to wind the plumb line on the spool. Braking means are provided which normally prevent unwinding of the plumb line from the spool and which are releasable to allow for such unwinding. Further, means are associated with the unopen end of the housing which are operable to mark the point from which a plumb line is drawn. The marking means may also be adapted to secure the plumb bob device at the point from which the plumb line is drawn. The invention also resides in the means operable to wind the plumb line on the spool. Finally, resilient means may be provided within the housing for engaging the plumb bob when the plumb bob is received within the open end of the housing to aid in retaining the plumb bob within the housing.

For the purpose of providing a detailed description of a plumb bob device constructed in accordance with the teachings of the present invention, reference will now be made to the drawings, wherein:

FIGURE 1 is a side elevational view of a plumb bob device constructed in accordance with the teachings of the present invention;

FIG. 2 is a side elevational view of the device shown in FIG. 1 taken from the right side as viewed in FIG. 1;

FIG. 3 is a sectional view taken substantially along the line 3—3 in FIG. 1;

FIG. 4 is a sectional view taken substantially along line 4—4 in FIG. 2;

FIG. 5 is a sectional view taken substantially along line 5—5 in FIG. 1;

FIG. 6 is a partial sectional view corresponding to the view shown in FIG. 5 illustrating the plumb line rewind means in the rewind condition;

FIG. 7 is an enlarged, sectional view of modified marking means utilizable with the plumb bob device of FIGS. 1–6; and FIG. 8 is a perspective view of a beam clamp which may be utilized with the plump bob device shown in FIGS. 1–6 to allow for securing the device at the point from which a plumb line is drawn.

While the invention has been shown and will be described in some detail with reference to particular exemplary embodiments thereof, there is no intention that it be limited to such details. Quite to the contrary, it is intended here to embrace all modifications, alternatives and equivalents falling within the spirit and scope of the invention.

Referring now to the drawings, and more specifically to FIGS. 1–6, a unitary, self-storing plumb bob device 10 is shown which is constructed in accordance with the teachings of the present invention. The plumb bob device includes an elongated, substantially cylindrical housing 12 having a tapered upper end and an open lower end. The housing 12 is defined by a pair of substantially semi-cylindrical sections 12a and 12b, as best shown in FIG. 1. The housing sections 12a and 12b are suitably secured together, such as by bolts or screws (not shown), so that the sections may be readily separated. The housing 12 is designed to fit within the hand of a user and has finger receiving indentations 15 formed within the section 12b.

A spool 16 (FIGS. 3–6) is mounted for rotational movement within the housing 12, the ends of the spool being journaled within bushings 17 positioned within apertures 18 formed in the housing sections 12a and 12b. A plumb line 20 has one end thereof secured to the spool so that the plumb line may be wound upon the spool, as shown in FIGS. 4 and 5, and the plumb line 20 is free to pass or slide out the open end of the elongated housing 12. A plumb bob 22 is secured to the other end of the plumb line 20. As shown in FIGS. 4 and 5, the plumb bob 22 is adapted to be received within the open end of the housing 12 for storage therein when the plumb bob device is not in use.

For the purpose of normally preventing unwinding of the plumb line 20 from the spool 16, a brake shoe 24 is provided within the housing 12 which is mounted for pivotal movement about point 25, and is adapted to brakingly engage the spool 16. A spring member 26 is disposed between the upper end of the brake shoe 24 and the inside of the housing 12 (FIGS. 3 and 4) for urging the brake shoe 24 into engagement with the spool 16 so that the spool is thereby held against rotational movement to prevent unwinding of the plumb line and thus to prevent extraction of the plumb line. As may be seen, the spring member 26 is disposed within an aperture 27 formed within the housing 12. For the purpose of releasing the brake shoe to allow for unwinding and extraction of the plumb line 20, a push button 30 is provided which extends through an aperture 31 in the housing 12 into engagement with the lower end of the brake shoe 24, the push button 30 being disposed in alignment with the finger receiving indentations 15, as best seen in FIGS. 1, 2 and 4. When the push button 30 is depressed, the brake shoe 24 is thereby caused to pivot about point 25 away from the spool 16 against the force of the spring 26 so that the spool is released for rotational movement and the plumb line is free to be unwound and extracted. When the push button 30 is thereafter released, the spring member 26 again functions to force the brake shoe 24 into engagement with the spool 16 to prevent further rotational movement thereof and thus to prevent further unwinding and extraction of the plumb line.

In operation of the explary plumb bob device 10, the plumb bob 22 has sufficient weight to cause the plumb line to be thereby unwound and extracted when the device is held in the upright position shown in FIGS. 1, 2 and 4–6 and the brake shoe 24 is released by depressing the push button 30. Consequently, when the exemplary plumb bob device is positioned in place in the upright position, a user thereof need only depress the push button 30 and the plumb bob 22 will drop out of the open end of the housing 12 causing the plumb line to be unwound and withdrawn therefrom. Thereafter, when the push button 30 is released the spool 16 is locked against further rotational movement by the brake shoe 24 so that the plumb line is locked against further unwinding and extraction and the plumb bob is held in place.

For the purpose of winding or rewinding the plumb line 20 on the spool 16, winding means have been provided which are operable to impart rotational movement to the spool 16 when the brake shoe 24 is released. The winding means includes a driving element 32 which extends through an axial bore 16a formed in the spool. Additionally, the winding means includes a handle 34 which is secured to one end of the driving member 32 for pivotal movement between a nondriving position, as shown in FIG. 5, and a driving position, as shown in FIG. 6. Additionally, the driving member 32 and the spool 16 have mating driving surfaces 32a and 16b at the end opposite the handle 34 which may, for example, be serrated or notched to insure positive gripping therebetween and which are moved into driving relationship when the handle 34 is pivoted to the driving position.

Further, the mating ends of the spool and the driving member extend outwardly of the housing so that the end of the spool may be manually grasped and rotational movement may be manually imparted thereto. To facilitate manual gripping of the end of the spool, it may be knurled. Thus, the system allows for finger tip adjustment.

For the purpose of moving the driving member and the spool into driving relationship, the handle 34 is provided with an overcenter camming surface 34a which engages a convex spring 35 mounted at the associated end of the spool 16 when the handle 34 is pivoted from the nondriving position, shown in FIG. 5, to the driving position, shown in FIG. 6, and which cooperates with the spring 35 to cause the driving member to be drawn to the left as viewed in FIGS. 5 and 6 until the mating surfaces 32a and 16a of the driving member and the spool are in driving engagement. With the overcenter design of the camming surface 34a and the spring 35, the handle 34 is maintained thereby in the driving position, once it is pivoted thereto, in the absence of force being imparted to the handle to pivot it back to the nondriving position. Once the handle 34 has been pivoted to the driving position, the user may depress the push button 30 to release the spool 16 and may then crank the handle to impart rotational movement to the spool so that the plumb line 20 is wound thereupon. When the plumb line has been fully wound upon the spool 16 so that the plumb bob 22 has been drawn to the position within the open end of the housing 12 shown in FIGS. 4 and 5, the push button 30 may be released so that the spool is locked by the brake shoe 24 against rotational movement and the handle 34 may be pivoted to the non-driving position shown in FIG. 5. At this time, the plumb bob device is in its stored condition.

For the purpose of preventing rotational movement of the handle 34 when it is in the nondriving position shown in FIG. 5, the handle is provided with a projection 34b which is received within an aperture 35 formed in the housing 12.

Additionally, for the purpose of aiding in retaining the plumb bob 22 within the housing 12, spring means are provided within the housing 12 adjacent the open end thereof for engaging the plumb bob. More specifically, spring elements 36 are positioned within the housing 12 around the inner periphery thereof, adjacent the open end thereof, to resiliently engage the plumb bob 22. The spring elements 36 are selected to have insufficient strength to retain the plumb bob 22 within the housing when the spool 16 is released so that the plumb bob 22 automatically drops out of the housing, when the push button 30 is depressed, to unwind and extract the plumb line 20.

In the exemplary arrangement, means are provided for insuring that the plumb line 20 is centered within the open end of the housing 12 when the plumb line is being wound upon or unwound from the spool. For this purpose, a guide plate 39 is provided at an intermediate position within the housing between the spool 16 and the plumb bob 22. As may be seen, the guide plate 39 has a centrally located guide aperture 39a through which the plumb line 20 passes so that the plumb line is thereby centered within the open end of the housing.

In keeping with the present invention, means are associated with the nonopen end of the housing which are adapted to mark the point from which a plumb line is drawn. In the exemplary arrangement shown in FIG. 4, the marking means is also adapted to secure the device at a point from which the plumb line is drawn. In this arrangement, the marking means is in the form of a screw-like member 40 which is removably secured between the sections 12a and 12b of the housing 12. The exemplary screw-like member 40 includes an upper wood screw portion 40a and a lower metallic screw portion 40b, which blend together as shown. As may be seen, the elements 12a and 12b join at the upper ends thereof to define a rectangular or square opening 42 and the screw-like member 40 has an intermediate, rectangular or square section 40c which is received within the opening 42 and corresponds in cross section to the opening 42. For the purpose of preventing the screw-like element 40 from falling out of the housing 12, a flange 40d is formed at the lower end of the square or rectangular section 40c which engages portions of the inner surfaces of the sections 12a and 12b adjacent the opening 42, as shown in FIGS. 4 and 5. Since, in the exemplary arrangement, the sections 12a and 12b of the housing 12 may be separated, it will be apparent that the screw-like member 40 may be removed from the plumb bob device and other marking means may be substituted therefor. In the exemplary arrangement, a protective cover 43 is provided for the screw-like member. As may be seen, the cover 43 has a sharp, upper point and has internal threads which allow for threading the cover onto and off of the screw-like member 40.

It will be apparent that the housing 12 may be modified by providing a removable panel in one of the sections 12a and 12b at the upper end thereof to facilitate the removal and replacement of the screw-like member 40. Referring now to FIGS. 1 and 2, such a removable panel may be provided between the dotted line 44 in the section 12b and the top of the section, and a tongue and groove arrangement may be employed for connection at line 44.

In operation of the exemplary plumb bob device 10, a user may mark the point from which a plumb line is drawn with the sharp point of the protective cover 43 or the user may remove the protective cover and mark the point with the sharp point of the screw-like member 40. Alternatively, the user may remove the protective cover 43 and secure the plumb bob device at the point from which the plumb line is drawn. For this latter purpose, the wood screw portion 40a of the screw-like member 40 may be threaded into a suitable wood surface or the metal screw portion 40b of the screw-like member may be threaded into a threaded aperture of a beam clamp 46, as shown in FIG. 8, which is secured to a beam or the like.

The exemplary beam clamp 46 includes a pair of threaded apertures 46a and 46b which are adapted to receive the metal screw portion of the screw-like member 40. The beam clamp has a U-shaped portion adapted to receive a beam or the like. For the purpose of securing the beam clamp to a beam or the like, a threaded locking member 46c which may be threaded into locking relationship with the beam or the like, is received within a threaded aperture in the beam clamp. If the beam clamp is secured to a beam or the like with the U-shaped portion disposed in the upright, vertical position, it will be apparent that the screw-like member 40 will be threaded into the downwardly extending aperture 46b so that the plumb bob device 10 hangs in the upright, vertical position shown in FIGS. 1, 2 and 4–6. Alternatively, if the beam clamp is secured to a beam or the like with the U-shaped portion disposed in the horizontal position, the screw-like member 40 will be threaded into the then downwardly extending threaded aperture 46a so that the plumb bob device again hangs in the upright, vertical position.

Referring now to FIG. 7, a modified marking means arrangement is shown which is adapted for use with the plumb bob device shown in FIGS. 1–6. More specifically, marking means are disclosed which may be substituted for the screw-like member 40. The marking means in FIG. 7 includes a tip housing 50 provided at the upper end of the main housing 12 which has a rectangular or square intermediate section 50a adapted to be received within the square or rectangular opening 42 defined between the sections 12a and 12b of the main housing 12. Additionally, a flange 50b is formed adjacent the lower end of the square or rectangular section 50a to prevent extraction of the marking means when the sections 12a and 12b are connected together.

For the purpose of providing a desired mark which marks the point from which a plumb line is drawn, a wick-like marking element 52 is provided. As may be seen, one end of the wick-like marking element 52 is disposed within a marking fluid container 54 and the other end extends outwardly of the tip housing 50, at the top thereof, through an upper, cylindrical portion 54a of the container. The cylindrical portion 54a extends through a vertical bore 50c provided in the tip housing 50. In the exemplary arrangement, the container 54 is supported between the flange 50b of the tip housing 50 and a support bracket 55 which is provided within the main housing 12. The marking fluid may, for example, be ink and the wick-like element 52 may be constructed of a suitable capillary material, such as felt or porous plastic.

For the purpose of normally enclosing the marking element 52, a pliable or flexible, inner protective cover 58 is provided which has a multiple slit, normally closed top to allow the marking element to pass through the top of the cover 58 when the cover is moved axially relative to the marking element. The protective cover 58 is disposed within an axial opening 50d formed in the tip housing 50 and is urged outwardly thereof by a spring element 60. A flange 58a is formed around the lower end of the cover 58 to limit the outward movement of the cover 58 and to prevent the cover from being extracted from the opening 50d. For the purpose of causing the protective cover 58 to be moved axially inwardly along the marking element 52 so that the tip of the marking element 52 is exposed and a mark is made thereby when the device 10 is moved into engagement with a surface from which a plumb line is to be drawn, a rigid, outer, substantially cylindrical cover 62 is provided which is disposed coaxially of the inner cover 58. Thus, the outer cover 62 is likewise disposed within the opening 50d and has a flange 62a at the lower end thereof disposed between the flange 58a of the inner cover 58 and the inner surface of the aperture 50d for engaging the inner surface of the opening 50d to limit the outward movement thereof and prevent extraction thereof. It follows then that the inner cover 58 and the outer cover 62 are concurrently urged outwardly. Moreover, it will be apparent that, since the flanges 62a and 58a are in engagement, the inner cover 58 will be moved axially inwardly within the opening 50d against the force of the spring 60 as the outer cover is moved axially inwardly of the opening 50d.

During operation of the plumb bob device 10 with the modified marking means, the device is moved toward the surface from which a plumb line is to be drawn until the surface is engaged by the outer cover 62. As the device 10 is thereafter moved further toward the surface, the outer cover 62 and thus the inner cover 58 are concurrently caused to move inwardly of the opening 50d against the force of the spring member 60, i.e. the covers 62 and 58 are depressed within the opening 50d, so that the wick-like marking member 52 is forced out of the top of the protective inner cover 58 into engagement with the surface to cause a mark to be made on the surface. In other words, the protective inner cover 58 is drawn down past the wick-like marking element 52 and the wick-like marking element passes through the slit top thereof into engagement with the surface.

In view of the foregoing, it will be seen that a new and improved plumb bob device has been provided which may be conveniently used with one hand of a user. More specifically, it will be seen that such a device has been provided which has means associated therewith which is adapted to mark the point from which a plumb line is drawn or to secure the device at the point from which the plumb line is drawn.

What is claimed is:

1. In a plumb bob device, the combination which comprises a housing defining an elongate generally cylindrical central storage chamber, said housing defining an opening at one end thereof providing ingress and egress with respect to said chamber, the other end of said housing being closed, marking means on said closed end and substantially aligned with the axis of said chamber and said opening, spool means mounted for rotation within said housing, manually engageable means externally disposed on said housing and operatively connected to said spool means to effectively rotate within said housing, said spool means being disposed intermediate said chamber and said marking means, a plumb line having one end secured to said spool means for winding the line thereon, a plumb bob secured to the other end of said plumb line and receivable in said chamber through said opening, guide means in said housing to maintain said line adjacent said spool means substantially on said axis, brake means engageable with said spool means to restrain rotation thereof, resilient means urging said brake means into the engaged position, and manual means externally disposed in said housing and operatively connected to said brake means whereby said brake means is movable to the released position against the influence of said resilient means.

2. The device as recited in claim 1 wherein the marking means includes a wick-like marking element and means are provided for normally enclosing the marking element which are operable to expose the marking element so that a mark may be made thereby.

3. The device as recited in claim 2 wherein the enclosing and exposing means includes an inner, pliable protective cover having a multiple slit top, an outer, rigid cover for engaging a surface to be marked and for causing the inner cover to move relative to the marking element as the housing is thereafter moved toward the surface so that the marking element is caused to move through the slit top into engagement with the surface, and spring means for maintaining the covers in the enclosing condition.

4. The device as recited in claim 1 wherein spring means are provided within the housing adjacent the open end for engaging the plumb bob when the plumb bob is received therein to aid in retaining the plumb bob within the housing.

5. The device as recited in claim 1 wherein the marking means is adapted to secure the device at the point from which a plumb line is drawn.

6. The device as recited in claim 5 wherein the marking means includes a screw-like member extending outwardly of the housing which has a wood screw portion and a metal screw portion.

7. The pumb bob device of claim 1 wherein the marking means is removably secured at the closed end of the housing.

8. The device of claim 1 wherein said spool has a portion extending outwardly through said housing for manually imparting rotational movement to said spool.

9. The plumb bob device of claim 1 wherein the outer surface of said housing is generally cylindrical and configured for hand engagement and said manual means extends radially outward from said housing transverse to the axis of said housing for finger actuation.

10. The plumb bob device of claim 9 wherein said manual means extends outwardly adjacent said closed end.

11. The device of claim 1 including clutch means coupling said spool and said manually engageable means.

12. The device of claim 11 wherein the clutch means comprises a central axial aperture in said spool, a drive pin extending through said aperture and having a head portion at one end engageable with said spool, said manually engageable means being movably secured and in driving engagement with said pin, said manually engageable means being shiftable relative to said spool and having cam means engageable therewith to urge said head into driving engagement with said spool.

13. The device of claim 12 wherein said spool has a portion adjacent said head extending outwardly through said housing for manually imparting rotational movement to said spool.

14. In a plumb bob device, the combination which comprises an elongated, substantially cylindrical housing adapted to fit within a user's hand having one open end and having finger receiving indentations formed in the outer surface thereof, the other end of said housing being closed, marking means on said closed end and substantially aligned with the axis of said housing, a spool mounted for rotation within the housing having end portions journalled within aligned apertures formed in the housing and having an axial bore formed therein, a plumb line having one end secured to the spool for winding thereon and being adapted to pass out the open end of the housing, a plumb bob secured to the other end of the plumb line which is receivable within the open end of the housing, a centering plate disposed within the housing between the spool and the plumb bob having means for centering the plumb line in the open end of the housing, releasable brake means for engaging the spool to normally prevent rotation thereof, means for releasing the brake means so that the spool is free to be rotated, a driving member extending through the axial bore in the spool, the driving member and the spool having cooperable driving surfaces, a handle pivotally mounted at one end of the driving member for movement between a nondriving position and a driving position which has a cam portion for engaging the spool when the handle is pivoted to the driving position to cause the driving surface of the driving member to be drawn into driving relationship with the driving surface of the spool so that the handle may thereafter be rotated to impart rotational movement to the driving member and the spool when the brake means is released.

References Cited

UNITED STATES PATENTS

| 602,806 | 4/1898 | Johnston | 15—537 |
| 932,218 | 8/1909 | Wilson | 33—217 |
| 1,271,128 | 7/1918 | Brizendine | 33—216 |
| 2,384,914 | 9/1945 | Hoagland | 33—217 XR |
| 2,849,805 | 9/1958 | Kruse | 33—217 |
| 3,035,299 | 5/1962 | Gordon et al. | 15—537 |
| 3,044,731 | 7/1962 | Zelnick | 242—84.8 |
| 3,273,820 | 9/1966 | Quenot | 242—84.8 |
| 1,874,057 | 8/1932 | Murphy | 33—216 |
| 2,779,045 | 1/1957 | Harvey | 33—217 |

FOREIGN PATENTS 411,835    1925    Germany.

LEONARD FORMAN, *Primary Examiner.*

D. A. DEARING, *Assistant Examiner.*

U.S. Cl. X.R.

242—99; 401—195